US012668358B2

(12) United States Patent
Sanadiki

(10) Patent No.: US 12,668,358 B2
(45) Date of Patent: Jun. 30, 2026

(54) AIRCRAFT LANDING GEAR CONTROL SYSTEM

(71) Applicant: M Nizar Sanadiki, Dana Point, CA (US)

(72) Inventor: M Nizar Sanadiki, Dana Point, CA (US)

(73) Assignee: M Nizar Sanadiki, Dana Point, CA (US)

( * ) Notice: Subject to any disclaimer, the term of this patent is extended or adjusted under 35 U.S.C. 154(b) by 103 days.

(21) Appl. No.: 18/224,392

(22) Filed: Jul. 20, 2023

(65) Prior Publication Data

US 2024/0132205 A1      Apr. 25, 2024
US 2024/0228025 A9      Jul. 11, 2024

Related U.S. Application Data

(60) Provisional application No. 63/418,690, filed on Oct. 24, 2022.

(51) Int. Cl.
B64C 25/26 (2006.01)
B64C 25/20 (2006.01)
B64C 25/32 (2006.01)

(52) U.S. Cl.
CPC .............. B64C 25/26 (2013.01); B64C 25/20 (2013.01); B64C 25/405 (2013.01)

(58) Field of Classification Search
None
See application file for complete search history.

(56) References Cited

U.S. PATENT DOCUMENTS

| | | | | | |
|---|---|---|---|---|---|
| 3,850,389 | A | * | 11/1974 | Dixon | B64C 25/40 |
| | | | | | 244/103 S |
| 4,659,039 | A | * | 4/1987 | Valdes | B64C 25/40 |
| | | | | | 244/103 S |
| 5,104,063 | A | * | 4/1992 | Hartley | B64C 25/40 |
| | | | | | 244/103 S |
| 2007/0284478 | A1 | * | 12/2007 | Soderberg | B64C 25/36 |
| | | | | | 244/103 R |
| 2022/0348318 | A1 | * | 11/2022 | Howell | B64C 25/426 |

FOREIGN PATENT DOCUMENTS

HU          191018 B    * 12/1986

\* cited by examiner

*Primary Examiner* — Tamara L Weber
(74) *Attorney, Agent, or Firm* — Cohen IP Law Group P.C.; Michael N. Cohen

(57) ABSTRACT

An aircraft landing gear control system. As an aircraft prepares to land, the system determines the ground speed of the aircraft and causes the aircraft's wheels to rotate at an angular velocity that corresponds to the aircraft's ground speed so that upon landing, the aircraft wheels are not subjected to a sudden jarring impact.

19 Claims, 5 Drawing Sheets

300

AIRCRAFT LANDING GEAR CONTROL SYSTEM

CROSS-REFERENCE TO RELATED APPLICATIONS

This application claims priority to U.S. Provisional Application No. 63/418,690 filed Oct. 24, 2022, the entire contents of which are hereby fully incorporated herein by reference for all purposes.

FIELD OF THE INVENTION

The present invention belongs to the field of aircraft, including a system that controls the rotation of an aircraft's wheels during landing.

BACKGROUND

As is known, when an aircraft such as a plane lands, the wheels of the aircraft engage the ground, and the aircraft then rolls to a stop. However, because the wheels are not rotating at the moment of impact, when the impact occurs, the wheels are jarred and abruptly caused to rotate. This sudden impact often causes damage to the wheels' tires requiring the wheels to be replaced after a finite number of landings. In addition, the impact also often causes debris and/or rubber particles from the wheels to fall to the ground, requiring the runways to be periodically cleaned.

Accordingly, there is a need for a system that determines the ground speed of the aircraft just prior to landing and that causes the aircraft's wheels to rotate at an appropriate angular velocity so that the issues described above are minimized.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, and according to exemplary embodiments hereof, an aircraft landing gear control system is provided. As an aircraft prepares to land, the system determines the ground speed of the aircraft and causes the aircraft's wheels to rotate at an angular velocity that corresponds to the aircraft's ground speed so that upon landing, the aircraft wheels are not subjected to a sudden jarring impact.

Figure 1:
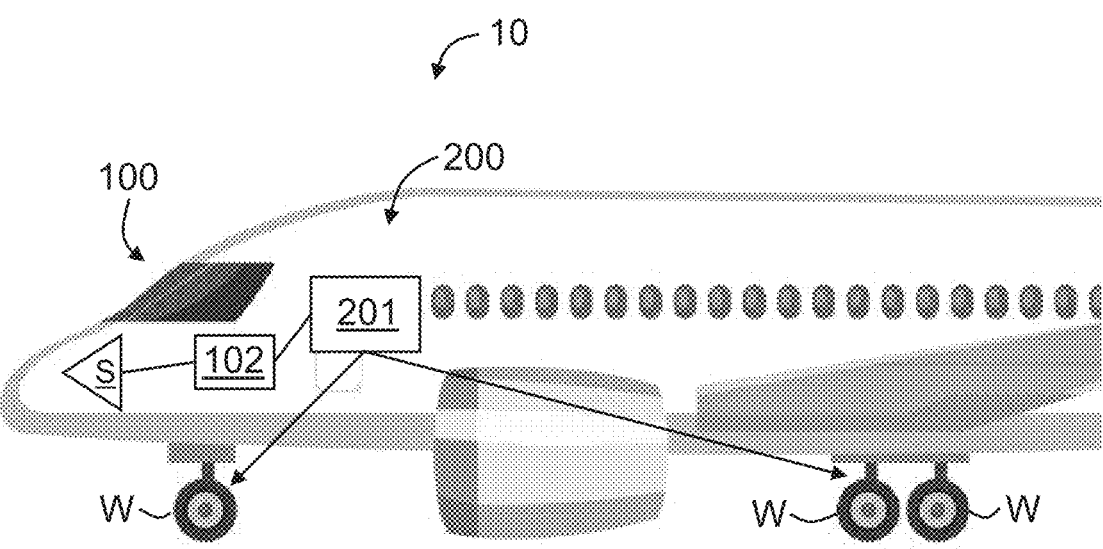
FIG. 1 shows a generalized diagram of an aircraft landing gear control system in accordance with exemplary embodiments hereof.

FIG. 1 shows a generalized diagram showing an aircraft wheel control system 10 according to exemplary embodiments hereof. In some embodiments, as shown in FIG. 1, the aircraft wheel control system 10 (also referred to herein as simply the system 10) includes a speed processing system 100 and a wheel rotating system 200. It is understood that the layout and/or arrangement of the systems 100, 200 depicted with respect to the aircraft are meant for demonstration and that the actual layout and/or arrangement of the systems 100, 200 with the aircraft may be different. It also is understood that the systems 100, 200 are represented as generic shapes for demonstration and that the systems 100, 200 may be formed as any shapes as required for the systems 100, 200 to perform their respective functionalities.

In general, the speed processing system 100 calculates the speed of the aircraft at a moment in time just prior to landing and converts this speed to a corresponding angular velocity (also referred to as rotational speed) for the aircraft's wheels. The system 100 then relays this information to the wheel rotating system 200, and the wheel rotating system 200 causes the wheels to rotate at the calculated angular velocity. Upon landing, the wheel rotating system 200 is generally disengaged so that the wheels may rotate freely along the ground in accordance with the ground speed of the aircraft. In this way, the aircraft brakes may be applied, and the aircraft may be brought to a stop. The system 10 may include other elements and components as necessary for the assembly 10 to perform its functionalities as described herein.

In some embodiments, as shown in FIG. 1, the speed processing system 100 includes a controller 102 (e.g., a computer) with the appropriate hardware and software to interface with the various onboard systems of the aircraft (e.g., with the aircraft's speed determining system S) as necessary to perform its functionalities. In some embodiments, the wheel rotating system 200 includes a controller 201 that communicates with the speed processing system 100 and that generally controls the functionalities of the wheel rotating system 200 and its various elements.

Figure 2:
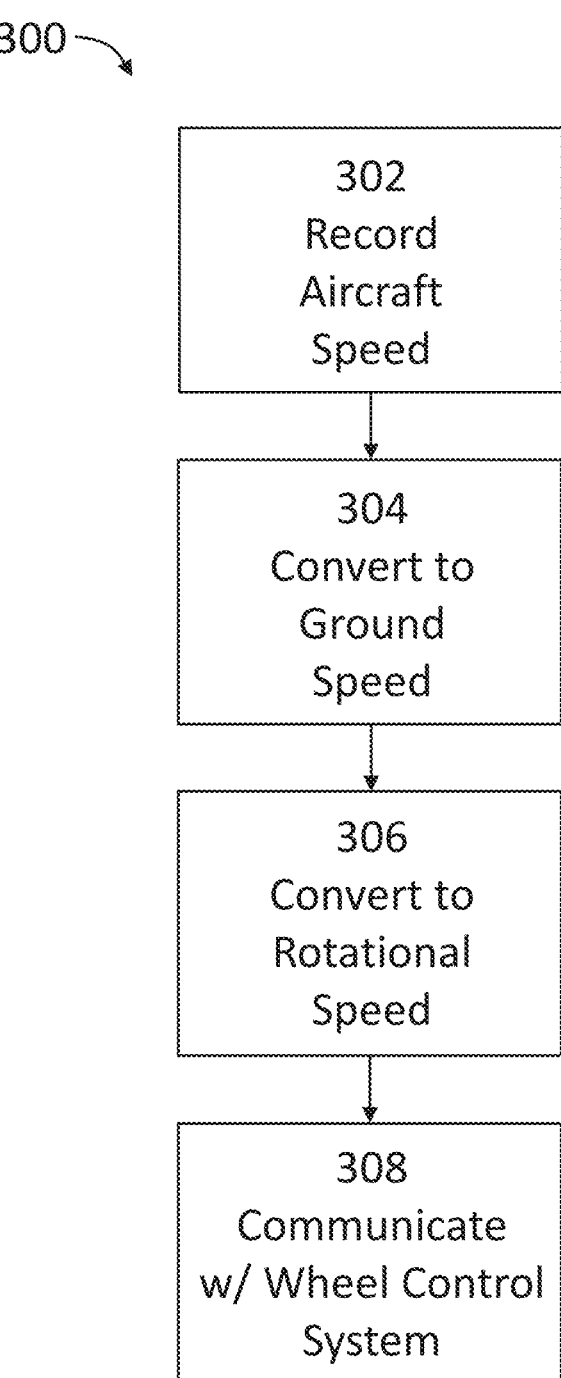
FIG. 2 shows actions that a speed processing system may take in accordance with exemplary embodiments hereof.

In some embodiments, as shown in FIG. 2, the speed processing system 100 performs at least some of the actions 300 described below:

302: Interfaces with the onboard speed sensing system, e.g., an air speed indicator (ASI) in communication with a pitot-static system (or other applicable aircraft systems), to record the aircraft's forward speed;

304: Converts, if necessary, the recorded forward speed to an equivalent ground speed;

306: Converts the determined ground speed of the aircraft to a corresponding angular velocity of the aircraft's wheels; and 308: Communicates this information to the wheel rotating system 200 (e.g., to the wheel rotating system's controller 201) for implementation.

In some embodiments, the angular velocity of a point on the outer circumference of the aircraft wheel is related to the velocity of the aircraft by the following equation:

$$\omega = v/r$$

where:

$\omega$ = the angular velocity of the wheel;

$v$ = the linear velocity of the airplane (e.g., the aircraft's ground speed); and $r$ = the radius of the wheel.

In some embodiments, it is preferable that the speed processing system 100 determine the ground speed of the aircraft at a point in time just prior to the landing of the plane, and that this ground speed is implemented as a corresponding angular velocity of the aircraft wheels. In this way, the subsequently calculated angular velocity of the aircraft's wheels may be accurate upon touchdown of the aircraft moments later.

Figure 3:
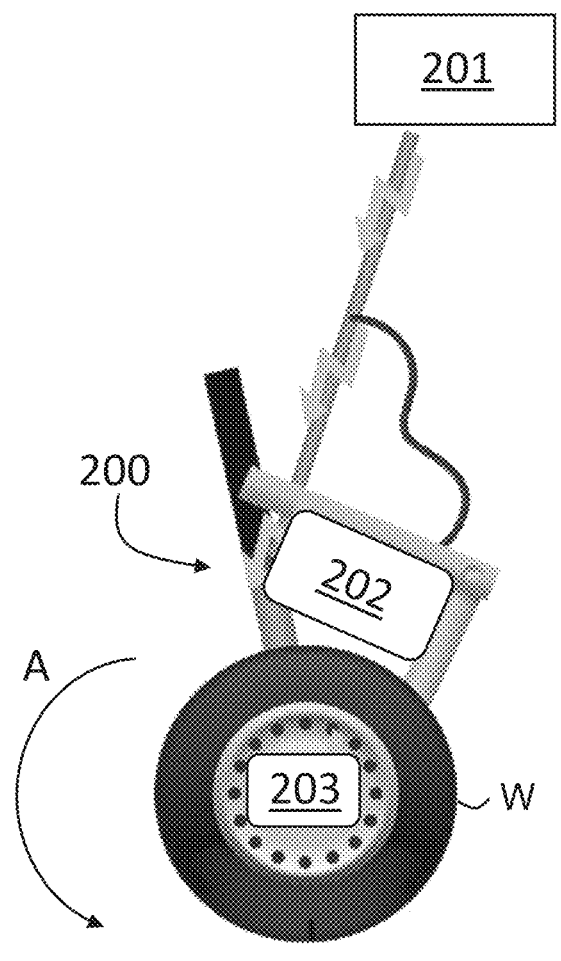
FIG. 3 shows aspects of a wheel rotation system in accordance with exemplary embodiments hereof.

In some embodiments, as shown in FIG. 3, the wheel rotating system 200 includes one or more wheel rotating motors 202 configured with at least one, and preferably with each, of the aircraft's wheels. In some embodiments, each motor 202 may be mechanically engaged with a corresponding wheel (e.g., with the wheel's hub) and may be configured to cause the wheel to rotate in a counterclockwise direction (as represented by the arrow A) and at a desired angular velocity. In some embodiments, the motor 202 may include a precision rotational motor such as a servo motor (e.g., a continuous rotation servomotor) including an angular velocity sensor and feedback system 203. However, it is understood that any suitable motor may be used and that the scope of the system 10 is not limited by the type of motor implemented. In addition, while only the front wheel of the aircraft is shown in FIG. 3, it is understood that the rear wheels and any other appropriate wheels also may be configured with motors 202.

In some embodiments, the wheel rotating system 200 receives a command from the speed processing system 100 to begin rotating the aircraft's wheels at a particular angular velocity. Upon receiving the command, the wheel rotating system 200 activates each wheel rotating motor 202 to begin rotating each respective wheel at the commanded angular velocity.

It is preferable that the process described above take place during the aircraft's approach to landing and after the aircraft has deployed its landing gear. In addition, it is preferable that the process begins and is completed prior to the landing of the aircraft so that the wheels are spinning at the commanded angular velocity upon touchdown of the plane.

As described herein, each aircraft wheel will be caused to transition from an angular velocity of effectively zero (prior to the engagement of the wheel rotating system 200) to the desired angular velocity (during the engagement of the wheel rotating system 200), and this wheel speed transition may be completed over a finite period of time T. In addition, each wheel, prior to the engagement of the wheel rotating system 200, will include an initial inertia proportional to its mass. This inertia, as is known, will initially oppose the force applied to the wheel by the wheel rotating system 200, and as such, the wheel rotating system 200 may be required to apply a force of higher magnitude to the wheel (e.g., a higher torque) at the onset of the wheel speed transition (to start the wheel rotating) and a force of lesser magnitude (e.g., a lesser torque) after the wheel has begun to rotate (to bring the wheels to the desire angular velocity).

In some embodiments, the wheel rotating system 200 may apply the force (e.g., the torque) to the wheel in stages. For example, the first stage may include causing the wheel to begin its rotation from its initial static state. Given the wheel's initial inertia, the force required to start the wheel rotating may be the largest force required during the wheel transition process. Accordingly, the wheel rotating system 200 may be designed to start the wheel transition process with a force of magnitude that will overcome the wheel's initial inertia and that may cause the wheel to begin to rotate.

Once the wheel is rotating, the wheel rotating system 200 may decrease the magnitude of the applied force, e.g., in a second stage of the wheel speed transition. In some embodiments, the force applied to the wheel may decrease from the first stage to the second stage following a linear taper, a parabolic taper, other suitable types of tapers, and/or using any combinations thereof.

Figure 4:
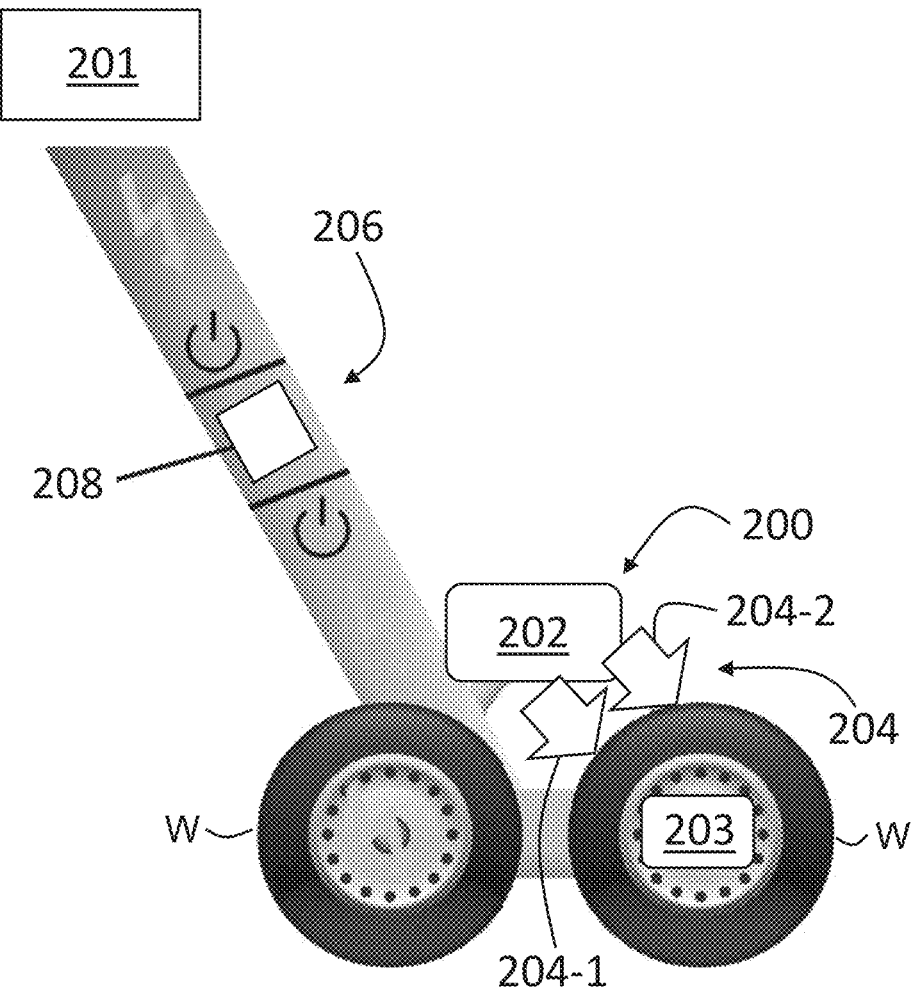
FIGS. 4-5 show aspects of a motor disengagement mechanism in accordance with exemplary embodiments hereof.

In some embodiments, as shown in FIG. 3, the wheel rotating system 200 may include wheel rotating motors 202 that operate continually through the first and second stages using a single drive mechanism 204 that are able to variably provide the forces of magnitude and the resulting angular velocities required over both stages. In other embodiments, as shown in FIG. 4, the wheel rotating system 200 may utilize wheel rotating motors 202 that utilize two or more drive mechanisms 204 (e.g., gears), with a first drive mechanism 204-1 (e.g., a first gear) designed to provide the first stage forces to cause the first stage angular velocities, and with a second drive mechanism 204-2 (e.g., a second gear) designed to provide the second stage forces to cause the second stage angular velocities. It is understood that while two stages and two corresponding drive mechanisms 204-1, 204-2 are described in the above example, other numbers of stages and other numbers of corresponding drive mechanisms 204 may be used as required.

In other embodiments, two or more wheel rotating motors 202 may be utilized, with a first motor 202-1 designed to apply the first stage forces and a second motor 202-2 designed to apply the second stage forces. The first and second motors 202-1, 202-2 may be utilize the same drive mechanism 204 and/or each motor 202 may utilize its own drive mechanism 204.

In some embodiments, because the wheel speed transition may take place over a time T, the process preferably begins at least an amount of time equal to or greater than the time T prior to the plane's touchdown. In addition, because the speed of the aircraft (e.g., it's ground speed) may vary (e.g., may decrease) during the landing sequence, and because the wheels are preferably caused to rotate at an angular velocity that corresponds to the aircraft's velocity at the moment of touchdown, final speed adjustments made by the wheel rotating system 200 to the wheels in the final seconds of the landing may be required.

Given the above, in some embodiments, the wheel rotating system 200 may first use an estimation of what the aircraft's landing speed may be at the moment of impact given the type and model of the aircraft, historical data regarding the landing speeds of such aircraft, the characteristics of the runway onto which the aircraft is landing (e.g., its length), environmental conditions (e.g., wind speed and direction, temperature, rain, snow, etc.) and other considerations. The estimation may be determined in real time during the aircraft's descent, may be precalculated, and/or may be determined using any combinations thereof.

Given the above, because the estimated landing speed of the aircraft may be less than the speed of the aircraft when the wheel speed transition process begins, the wheel rotating system 200 may begin the process by applying forces to the wheels determined to cause the wheels to spin at an angular velocity that corresponds to the estimated landing speed of the aircraft (the aircraft's speed at touchdown) vs. the aircraft's actual speed determined at the beginning of the wheel speed transition process (which may be greater). In this way, the wheel rotating system 200 may preferably not overshoot the required angular velocity of the wheels during the process, and instead, may achieve the wheel angular velocity in a velocity ramp-up process.

In some embodiments, the wheel rotating system's 200's speed feedback system 203 may enable the system 200 to continually sample the wheels' angular velocity in the final seconds before touchdown, to compare the angular velocity to the calculated corresponding aircraft velocity in that same moment, and to make fine tune adjustments to the wheels' angular velocity as required to match the angular velocity with the velocity of the aircraft (proportional to the wheels' radius). In some embodiments, this happens for each individual wheel, and accordingly, each individual wheel and its respective wheel rotating motors 202 and/or drive mechanisms 204 may include the necessary angular velocity sensors and feedback systems 203 (in communication with the wheel rotating system's 200's controller 201) such that the angular velocity of each wheel may be fine tuned just prior to touchdown.

In some embodiments, upon touchdown of the plane, the wheel rotating system 200 disengages the wheel rotating motors 202 from each of the respective wheels so that the rotation of the wheels is no longer influenced by the motors 202. In some embodiments, this is accomplished by a motor disengagement mechanism 206 that is designed to sense the landing of the plane and to facilitate the subsequent (and preferably immediate) disengagement of the motors 202. The term disengagement may generally refer to the physical disengagement of the motors 202 from the wheels, the powering off of the motors 202, and/or any other type of disengagement that results in the motors 202 no longer influencing the rotation of the wheels such that the wheels may roll freely on the ground.

In some embodiments, as shown in FIG. 4, the motor disengagement mechanism 206 includes one or more displacement sensor(s) 208 configured with the aircraft's landing gear. As is known, aircraft landing gear includes shock absorbers and other structural elements that may flex upon the landing of the plane due to the weight of the aircraft pressing downward onto the ground surface. In some embodiments, the displacement sensor(s) 208 are designed and configured to sense the flex of the landing gear upon touchdown of the plane. In some embodiments, the displacement sensor(s) 208 may be configured to determine when the flexing of the shock absorbers (and/or other structural elements) is equal to or greater than a predetermined value (e.g., 5 mm-10 mm), and upon this determination, the sensor(s) 208 may relay this information to the wheel disengagement mechanism 206 which in turn disengages the wheel rotating motors 202 from the wheels.

Figure 5:
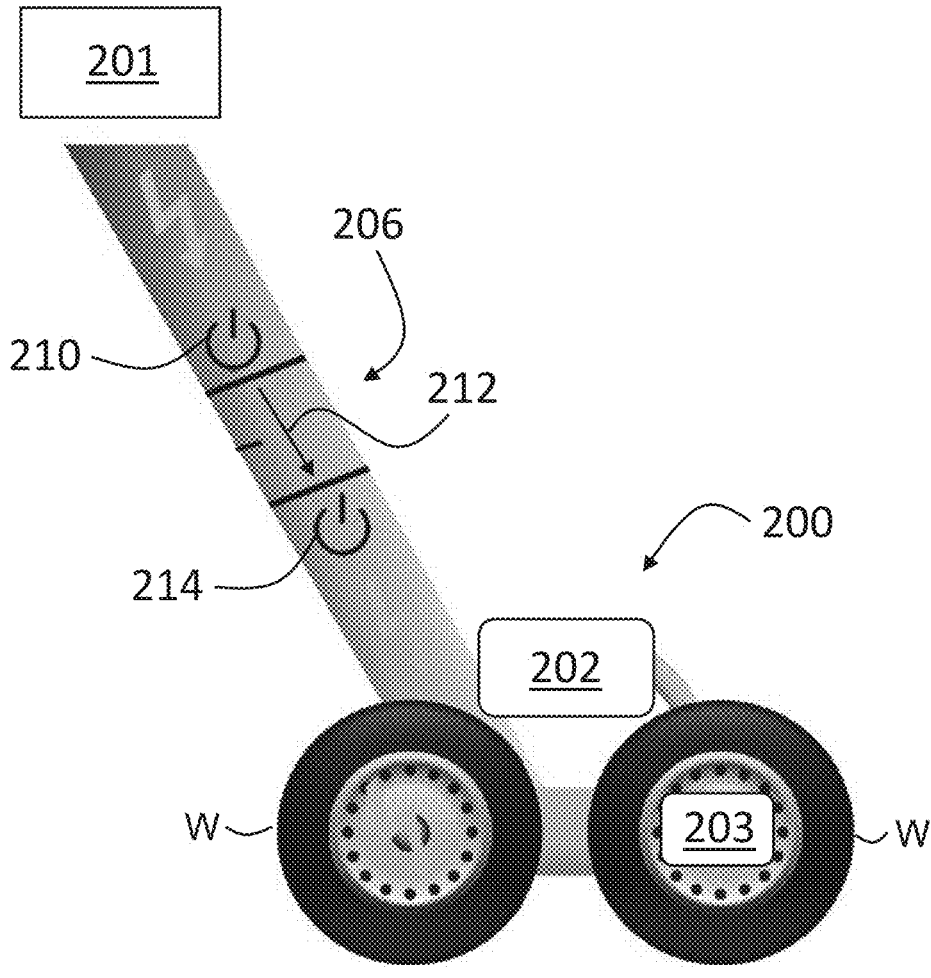

In some embodiments, as shown in FIG. 5, the motor disengagement mechanism 206 includes a laser 210 configured to emit a laser beam 212 to a light sensor 214. The laser 210 and the sensor 214 are aligned with one another so that when the aircraft's landing gear is not under stress (e.g., not contacting the ground) the light sensor 214 receives and senses the laser beam 212 emitted from the laser 210. In addition, the laser 210 and the sensor 214 may be configured so that if the landing gear flexes by a predetermined value (e.g., 5 mm-10 mm), the laser 210 and the light sensor 214 may fall out of alignment and the sensor 214 may no longer receive or sense the beam 212. When this happens, the motor disengagement mechanism 206 is triggered to disengage the motors 202 from the wheels so that the wheels may roll freely without influence from the motors 202.

While only the rear wheels of the aircraft are shown in FIGS. 4-5, it is understood that the front wheel and any other appropriate wheels also may be configured with a motor disengagement mechanism 206, one or more displacement sensor(s) 208, a laser 210, and/or a light sensor 214.

In other embodiments, the wheel rotating system 200 disengages the motors 202 from the wheels just prior to the landing of the aircraft. In this way, the wheels are rotating at the desired angular velocity but are already free to rotate freely upon touching the ground. This may compensate for any lag in the disengagement of the wheels from the wheel rotating motors 202 (e.g., the lag that may occur between touchdown being sensed and the disengagement of the wheels). In this embodiment, the system 10, e.g., the speed processing system 100, may communicate with one or more aircraft systems (e.g., an altitude sensing system) to determine a moment just prior to touchdown (e.g., when the aircraft is about 1'-50' above the ground, and preferably when the aircraft is about 1'-10' above the ground), and may trigger the wheel disengagement mechanisms 206 to disengage each wheel.

In some embodiments, if at any time, the system 10 senses that the angular velocity of the wheels is not within a safe range of the desired angular velocity, the system 10 may include a safety mechanism that automatically causes the wheel disengagement system 206 to immediately disengage the wheels.

It is understood that any aspect and/or element of any embodiment of the system 10 described herein or otherwise may be combined with any other aspect and/or element of any other embodiment of the system 10 described herein or otherwise in any way to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An aircraft landing gear control system comprising:
   a speed processing system adapted to determine a ground speed of an aircraft at a time prior to a landing of the aircraft;
   a wheel rotation system including at least one wheel rotating motor adapted to cause at least one wheel of the aircraft to rotate;
   a wheel disengagement system configured with the wheel rotation system and adapted to disengage the at least one wheel rotating motor from the at least one wheel;
   one or more aircraft landing sensors including one or more light sources aligned with corresponding one or more light sensors, wherein the landing of the aircraft causes at least one of the one or more light sources to become misaligned with a corresponding at least one of the one or more light sensors and wherein the misalignment causes the wheel disengagement system to disengage the at least one wheel rotating motor from the at least one wheel;
   wherein the speed processing system determines a ground speed of the aircraft, and converts the ground speed to a corresponding angular velocity of the at least one wheel;
   wherein the at least one wheel rotating motor causes the at least one wheel to rotate at the corresponding angular velocity.

2. The aircraft landing gear control system of claim 1 wherein the speed processing system includes a controller in communication with an on-board aircraft system that determines the aircraft's ground speed, and wherein the controller receives information regarding the ground speed of the aircraft from the on-board aircraft system.

3. The aircraft landing gear control system of claim 1 further comprising an angular velocity sensor and feedback system adapted to sense an angular velocity of the at least one wheel and to communicate the angular velocity of the at least one wheel to the wheel rotation system.

4. The aircraft landing gear control system of claim 1 further comprising a drive mechanism configured with the at least one wheel rotating motor and configured to apply a first force of a first magnitude to the at least one wheel at an onset of a wheel rotating process and a second force of a second magnitude to the at least one wheel at a time after the onset of the wheel rotating process.

5. The aircraft landing gear control system of claim 4 wherein the drive mechanism includes a first stage adapted to provide the first force of the first magnitude to the at least one wheel and a second stage adapted to provide the second force of the second magnitude to the at least one wheel.

6. The aircraft landing gear control system of claim 1 wherein the at least one wheel rotating motor includes a first one of the at least one wheel rotating motor configured to apply a first force of a first magnitude to the at least one wheel at an onset of a wheel rotating process and a second one of the at least one wheel rotating motor configured to apply a second force of a second magnitude to the at least one wheel at a time after the onset of the wheel rotating process.

7. The aircraft landing gear control system of claim 1 wherein the speed processing system is adapted to determine, prior to landing, an estimated landing speed of the aircraft.

8. The aircraft landing gear control system of claim 7 wherein the speed processing system converts the estimated landing speed to a corresponding estimated angular velocity of the at least one wheel, and wherein the at least one wheel rotating motor causes the at least one wheel to rotate at the corresponding estimated angular velocity.

9. The aircraft landing gear control system of claim 1 wherein the speed processing system is adapted to determine, prior to landing and when the aircraft is about 1'-50' above the ground, an estimated landing speed of the aircraft;
   wherein the speed processing system converts the estimated landing speed to a corresponding estimated angular velocity of the at least one wheel, and wherein the at least one wheel rotating motor causes the at least one wheel to rotate at the corresponding estimated angular velocity.

10. A method of controlling an aircraft landing gear, the method comprising:
   determining, using a controller, an expected future touchdown ground speed of an aircraft for a corresponding expected future touchdown of the aircraft, the expected future touchdown ground speed different than an actual real-time ground speed of the aircraft;
   converting, using a controller, the expected future touchdown ground speed to a corresponding expected future angular velocity of at least one wheel of the aircraft;
   causing, using a wheel rotation system, the at least one wheel of the aircraft to rotate at the expected future angular velocity;
   determining, using a speed processing system, the actual real-time ground speed of the aircraft;
   converting, using the speed processing system, the real-time ground speed to a target angular velocity of the at least one wheel of the aircraft;
   causing, using the wheel rotation system, the at least one wheel of the aircraft to rotate at the target angular velocity.

11. The method of claim 10 further comprising:
   disengaging the wheel rotation system from the at least one wheel upon a sensing of a real-time touchdown of the aircraft.

12. The method of claim 11 wherein the sensing of the real-time touchdown of the aircraft includes using one or more aircraft landing sensors.

13. The method of claim 12 wherein the one or more aircraft landing sensors includes one or more displacement sensors configured with a landing gear of the aircraft and adapted to sense a deflection of the landing gear upon the real-time touchdown of the aircraft.

14. The method of claim 12 wherein the one or more aircraft landing sensors includes one or more light sources aligned with corresponding one or more light sensors, wherein the real-time touchdown of the aircraft causes at least one of the one or more light sources to become misaligned with a corresponding at least one of the one or more light sensors and wherein the misalignment causes the sensing of the real-time touchdown of the aircraft.

15. The method of claim 10 wherein using a wheel rotation system includes using a drive mechanism configured with at least one wheel rotating motor and configured to apply a first force of a first magnitude to the at least one wheel at an onset of a wheel rotating process and a second force of a second magnitude to the at least one wheel at a time after the onset of the wheel rotating process.

16. The method of claim 10 wherein the determination of the expected future touchdown ground speed of the aircraft occurs prior to the corresponding expected future touchdown.

17. A method of controlling an aircraft landing gear, the method comprising:

determining, using a controller, a ground speed of an aircraft;

converting, using a controller, the ground speed to a corresponding target angular velocity of at least one wheel of the aircraft;

causing, using a wheel rotation system, the at least one wheel to rotate at the target angular velocity;

determining, using an angular velocity sensor and feedback system, and after causing the at least one wheel to rotate at the target angular velocity, a real-time angular velocity of the at least one wheel;

comparing the determined real-time angular velocity of the at least one wheel to a maximum allowed angular velocity determined separate from the groundspeed of the aircraft;

upon a determination that the real-time angular velocity of the at least one wheel is greater than the maximum allowed angular velocity then:

causing, using the wheel rotation system, the at least one wheel to rotate at an updated angular velocity that is less than the maximum allowed angular velocity and/or disengaging the wheel rotation system from the at least one wheel.

18. A method of controlling an aircraft landing gear, the method comprising:

using a speed processing system to determine a ground speed of an aircraft at a first time prior to landing;

using the speed processing system to convert the determined ground speed to a corresponding angular velocity of at least one wheel of the aircraft;

using a wheel rotation system including at least one wheel rotating motor to cause the at least one wheel of the aircraft to rotate at the corresponding angular velocity;

using an altitude sensing system to determine when the aircraft is within a predetermined distance above a ground surface at a second time prior to landing after the first time; and upon a determination that the aircraft is within the predetermined distance above the ground surface, disengaging the wheel rotation system from the at least one wheel.

19. The method of claim 18 wherein the predetermined distance is 1'-50'.

\*   \*   \*   \*   \*